3,026,269
POLYMERIZATION CATALYST

William Franklin Gresham, Wilmington, Del., and Nicholas G. Merckling, deceased, late of Wilmington, Del., by Noelle K. Merckling, administratrix, Baltimore, Md., assignors to E. I. du Pont de Nemours and Company, Wilmington, Del., a corporation of Delaware
No Drawing. Filed Sept. 11, 1958, Ser. No. 760,295
7 Claims. (Cl. 252—429)

This invention relates to novel catalyst systems and more particularly to catalyst systems useful in the polymerization of ethylene to solid polymers employing tungsten coordination complexes and to the process of polymerizing ethylene using novel tungsten catalyst systems. This application is a continuation-in-part of copending application S.N. 453,145, filed August 30, 1954, now U.S. Patent No. 2,872,439.

Heretofore, it has been widely known that ethylene can be converted to solid polymers under very high pressures in the presence of catalysts which are capable of yielding free-radicals under polymerization conditions.

It has also been known heretofore (U.S. Patents 2,213,155, 2,475,520, 2,467,234) that certain metal alkyls and Grignard reagents are capable of initiating the conversion of ethylene to solid polymers in the presence of hydrogenation catalysts promoted with alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and high pressures and advantageously in the presence of HCl-binding metals like aluminum powder (Fischer, German Patent 874,215, issued April 20, 1953).

Redox systems have frequently been disclosed for polymerization of olefinic compounds. In the past, redox systems have resulted in the formation of highly-branched low density polymers, except at extremely high pressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered, in accordance with the present invention, that extraordinary and highly useful effects are produced by reducing a compound of tungsten, in the manner hereinafter described, and bringing the resulting mixture into contact with a compound containing ethylenic unsaturation. In specific embodiments it has been found that tungsten compounds containing tungsten combined with radicals (suitable examples being alkoxy radicals, alkyl radicals and radicals which form acids when combined with hydrogen) can be used effectively in the formation of the catalyst. The reduction step is generally performed by admixing a tungsten compound with a strong reducing agent such as compounds having at least one metal-to-hydrocarbon bond. It is known that such agents will reduce the valence state of the tungsten to a lower state. The resulting complex containing the tungsten in the reduced valence combines with ethylenically unsaturated compounds and thereby causes their polymerization. In particular embodiments a sufficient quantity of the reducing agent is added to the tungsten compound to achieve the reduction of the tungsten to a valence state below three.

The nature of these coordination complexes is not fully understood, but they are evidently active catalysts or catalyst components which are capable of initiating the polymerization of ethylene in an extremely active manner to produce solid ethylene polymers. The density of ethylene polymers obtained through the use of these coordination complexes generally exceeds, at least to some extent, the density of polyethylene prepared by the use of free-radical types of catalysts, except those free-radical polymerization processes which employ such extremely high pressures as to produce abnormally high density polyethylene as compared with polyethylene made at moderately high pressure (700–1200 atmospheres) by a free-radical polymerization process (cf. U.S. Patent 2,586,833).

It is believed that the coordination complexes hereinabove described are novel compounds which have not been employed heretofore in the polymerization of ethylene. The complexes are difficult to isolate in the pure state but they are stable in the form of dispersions and solutions in hydrocarbon solvents. The catalytic complex is formed almost instantaneously on combination of the two components and is independent of the temperature at which the components are combined.

While the polymerization of ethylene to produce solid polymers in the presence of catalysts disclosed herein can be carried out under mild conditions, it is preferable, from an economic standpoint, to employ moderately high pressures, suitably from 1 to 200 atmospheres or higher, in order to facilitate the handling of ethylene. Much higher pressures, up to several thousand atmospheres, can be employed, but it is not desirable to do this in view of the extraordinary activity of the catalysts at lower pressures. Similarly, extremely low temperatures may be employed. The preferred temperatures are within the range of about 0–300° C.

The polymerization of ethylene according to the process of this invention, takes place most satisfactorily when the polymerization mixture is substantially moisture-free and also free of other sources of hydroxyl groups. Carbon dioxide should also be substantially excluded. As in numerous other ethylene polymerization processes, the polymerization mixture in the process of this invention is preferably kept free of oxygen, since oxygen reacts with the catalyst. In practical operations the oxygen content should preferably be held below 20 parts per million. Certain compounds which are capable of coordinating with the activated tungsten form coordination complexes which are too stable for optimum results, and accordingly, the presence of these compounds should preferably (although not necessarily) be avoided. In this category are ketones and esters. Hydrocarbon solvents, on the other hand, can be used quite effectively as reaction media.

The reagents which are effective in forming the active tungsten catalyst are tungsten salts and alkoxides generally, but tungsten halides are preferred. Suitable tungsten halides include tungsten chlorides, tungsten bromides, tungsten fluorides, tungsten oxychloride, tungsten oxybromides, etc. The reducing agents suitable in the formation of the catalysts of the present invention are organometallic compounds having at least one metal-to-hydrocarbon bond such as Grignard reagents. A particularly preferred class of reducing agents comprises tetravalent organometallic compounds such as alkali metal aluminum tetrahydrocarbons, and tin tetrahydrocarbons specific examples of which are sodium-aluminum tetraaryls, lithium aluminum tetraalkyls, tin tetraaryls, tin tetraalkyls.

The novel catalysts described herein are preferably used in dissolved or colloidally dispersed form. The active tungsten complex may be prepared in a separate and prior step. In the latter case, it is advisable to keep the active tungsten complex at around 0° C. and free from water and air contamination so as to avoid the decomposition of the complex.

The invention is illustrated further by means of the following examples:

*Example 1.*—Tungsten hexachloride (.005 mole) was dispersed in 100 cc. of cyclohexane, and .02 mole of tetrabutyl tin was added. The resulting deeply-colored solution was introduced into a 325 ml. shaker tube under a blanket of nitrogen, evacuated, flushed with nitrogen and re-evacuated. The shaker tube was then heated to 150° C. and pressured to 1000 p.s.i. with ethylene and agitated for 30 minutes. Thereupon, the temperature was increased to 200° C. and agitation continued for another 30 minutes. The resulting polymer was filtered from the reaction mixture and washed with a methanol and hydrochloric acid mixture, a methanol and aqueous sodium hydroxide mixture, and finally with acetone. The dry polymer produced weighed 21 grams and exhibited a density of 0.95 and could be compression molded into a tough film.

*Example 2.*—Tungsten hexachloride (0.005 mole) was dissolved in 100 ml. benzene under a blanket of nitrogen and a solution of phenylmagnesium bromide (0.04 mole) in diethyl ether mixed with 50 ml. of benzene was added under stirring. During the addition the temperature of the reaction mixture was kept at 6° C. The resulting mixture was placed into a 325 ml. shaker tube. The shaker tube was evacuated, flushed with nitrogen, and re-evacuated, heated to 160° C. and pressured with 2500 p.s.i. ethylene and agitated for 2 hours. The resulting polymer was filtered and washed by a procedure described in Example 1. The resulting dry polymer gave a tough film on compression molding at 190° C. and had a density of 0.95.

*Example 3.*—Into a 325 ml. stainless steel shaker tube was charged under an atmosphere of nitrogen 200 ml. benzene, 0.01 mole tungsten hexachloride and 0.02 mole of lithium aluminum tetracyclohexenylethyl. The nitrogen was replaced with ethylene and the reactor was agitated for a period of one hour at a temperature of 100° under an ethylene pressure of 1000 p.s.i. The resulting reaction mixture was cooled and filtered. The isolated polymer was washed with a methanol-HCl mixture, a methanol-aqueous NaOH mixture and acetone. On drying there was obtained 30 g. of high molecular weight polyethylene.

The examples have shown the catalytic activity of the present invention in the polymerization of ethylene. Similar catalytic activity is obtained by the use of reaction products from tungsten pentachloride and lithium aluminum tetraheptyl, tungsten pentabromide, and lithium aluminum tetraphenyl, tungsten oxytetrabromide and lithium aluminum tetradodecyl, tungsten hexafluoride and tin tetrabutyl, tungsten iodide and sodium aluminum tetraethyl and other tungsten halides and organometallic compounds in which a metal is bonded to a hydrocarbon radical.

The quantity of catalyst can be varied over a rather wide range. High molecular weight polymer is obtained regardless of whether a large quantity or a small quantity of the complex is employed. In general the catalyst concentration will vary from 0.001 to 10% by weight of monomer. As stated hereinabove the catalytically active complex is formed by the reaction of tungsten halide with an organometallic compound having at least one metal-to-hydrocarbon bond. The formation of the catalytically active complex is independent of the quantities of the components employed. Thus a minute quantity of one or the other component will nevertheless lead to the formation of the catalyst, i.e. reduce some of the tungsten to a valence state below three. However, the yield of polymer and the degree of polymerization will be affected by the ratio of components. For optimum yields of polymer it is desirable to employ the catalyst components in a molar ratio of the organo-metallic compound for the tungsten compound in a ratio of 0.5 to 10, particularly when the catalyst is formed in situ.

The polymers which are made under the conditions hereinabove described frequently have such high molecular weights that removal of catalyst by dissolving and filtering is extremely difficult. An effective procedure for obtaining the polymer in a clean form is to wash with methanol, acetone hydrochloric acid mixtures in a Waring Blendor several times followed by washing with acetone and thereafter, if necessary, followed by several acetone-aqueous sodium hydroxide washes and finally by acetone-water wash. The products thus obtained are generally white. While this procedure is highly satisfactory for preparing clean polymers, it is to be understood that simpler procedures such as washing with the reaction medium or treatment with water at elevated temperatures will be entirely suitable for various practical applications. For some applications it may not be essential to remove traces of catalyst.

The activity of the novel catalyst described hereinabove is of such a nature that the catalyst is well suited for polymerization of ethylenically-unsaturated compounds other than ethylene, suitable examples of other polymerizable olefinic compounds being propylene, butadiene, styrene, cycloalkenes, etc.

The structure of the polyethylene made in accordance with the process of this invention evidently is characterized by being a straight chain hydrocarbon with a small amount of branching and vinyl groups at one or both ends of at least some of the molecules. The infrared measurements indicate very little methyl substitution and a very small number of vinylidine groups, with little or no trans-unsaturation or carbonyl groups.

The ethylene polymers obtained in accordance with the process of this invention are highly valuable in numerous applications, especially in the form of films, molded articles, extruded insulation on wire, etc.

We claim:

1. A polymerization catalyst comprising the reduced tungsten reaction product obtained by reacting, in an inert, liquid hydrocarbon medium, a tungsten halide with an organometallic compound of the class consisting of alkali metal aluminum tetrahydrocarbons and tin tetrahydrocarbons, the molar ratio of said organometallic compound to said tungsten halide being from 0.5 to 10.

2. A polymerization catalyst comprising the reduced tungsten reaction product obtained by reacting, in an inert, liquid hydrocarbon medium, a tungsten halide with an alkali metal aluminum tetrahydrocarbon, the molar ratio of said tetrahydrocarbon compound to said tungsten halide being from 0.5 to 10.

3. A polymerization catalyst comprising the reduced tungsten reaction product obtained by reacting, in an inert, liquid hydrocarbon medium, a tungsten halide with a tin tetrahydrocarbon, the molar ratio of said tetrahydrocarbon compound to said tungsten halide being from 0.5 to 10.

4. A polymerization catalyst comprising the reduced tungsten reaction product obtained by reacting, in an inert, liquid hydrocarbon medium, a tungsten halide with a lithium aluminum tetraalkyl, the molar ratio of said tetraalkyl compound to said tungsten halide being from 0.5 to 10.

5. A polymerization catalyst comprising the reduced tungsten reaction product obtained by reacting, in an inert, liquid hydrocarbon medium, a tungsten halide with a tin tetraalkyl, the molar ratio of said tetraalkyl compound to said tungsten halide being from 0.5 to 10.

6. The catalyst as set forth in claim 4 wherein the tungsten halide is a tungsten chloride.

7. The catalyst as set forth in claim 5 wherein the tungsten halide is a tungsten chloride.

References Cited in the file of this patent

UNITED STATES PATENTS

| | | |
|---|---|---|
| 2,567,331 | Gaiser et al. | Sept. 11, 1951 |
| 2,692,836 | McAuley | Oct. 26, 1954 |
| 2,699,457 | Ziegler et al. | Jan. 11, 1955 |
| 2,725,374 | Mosher | Nov. 29, 1955 |
| 2,731,453 | Field et al. | Jan. 17, 1956 |
| 2,786,860 | Ziegler et al. | Mar. 26, 1957 |